United States Patent [19]
Gorgens et al.

[11] 3,739,645
[45] June 19, 1973

[54] DIFFERENTIAL PRESSURE INDICATING APPARATUS

[75] Inventors: Joseph E. Gorgens, Trumbull; William A. Heske, Fairfield; Randall Goff, Weston, all of Conn.

[73] Assignee: Dresser Industries, Inc., Dallas, Tex.

[22] Filed: Apr. 22, 1971

[21] Appl. No.: 136,457

Related U.S. Application Data

[63] Continuation-in-part of Ser. No. 859,246, Sept. 17, 1969, which is a continuation of Ser. No. 732,472, April 12, 1968, abandoned, which is a continuation-in-part of Ser. No. 565,857, July 18, 1966, abandoned.

[52] U.S. Cl. .................................. 73/407 R, 73/410
[51] Int. Cl. ............................................ G01l 13/02
[58] Field of Search ..................... 73/388 B, 407 R, 73/407 PR, 410

[56] References Cited
UNITED STATES PATENTS

| | | | |
|---|---|---|---|
| 3,459,045 | 8/1969 | Sanford | 73/407 R |
| 2,079,069 | 5/1937 | Johnson | 73/410 X |
| 2,652,846 | 9/1953 | Dunn | 73/410 X |
| 3,061,823 | 10/1962 | Crossley, Jr. | 73/407 X |

*Primary Examiner*—Donald O. Woodiel
*Attorney*—Robert W. Mayer, Thomas P. Hubbard, Jr., Daniel Rubin, Raymond T. Majesko, Roy L. Van Winkle, William E. Johnson, Jr. and Eddie E. Scott

[57] ABSTRACT

Apparatus for effecting differential pressure sensitivity of a pressure measuring device. A pressure sealed housing having a relatively high pressure inlet connection contains an expansion bellows having a relatively low pressure inlet connection. The bellows' free end moves in proportion to the pressure differential between the high and low pressure supply. A lever connected to the free bellows end to outward of the housing, transmits the bellows output force to an external pressure measuring apparatus.

9 Claims, 7 Drawing Figures

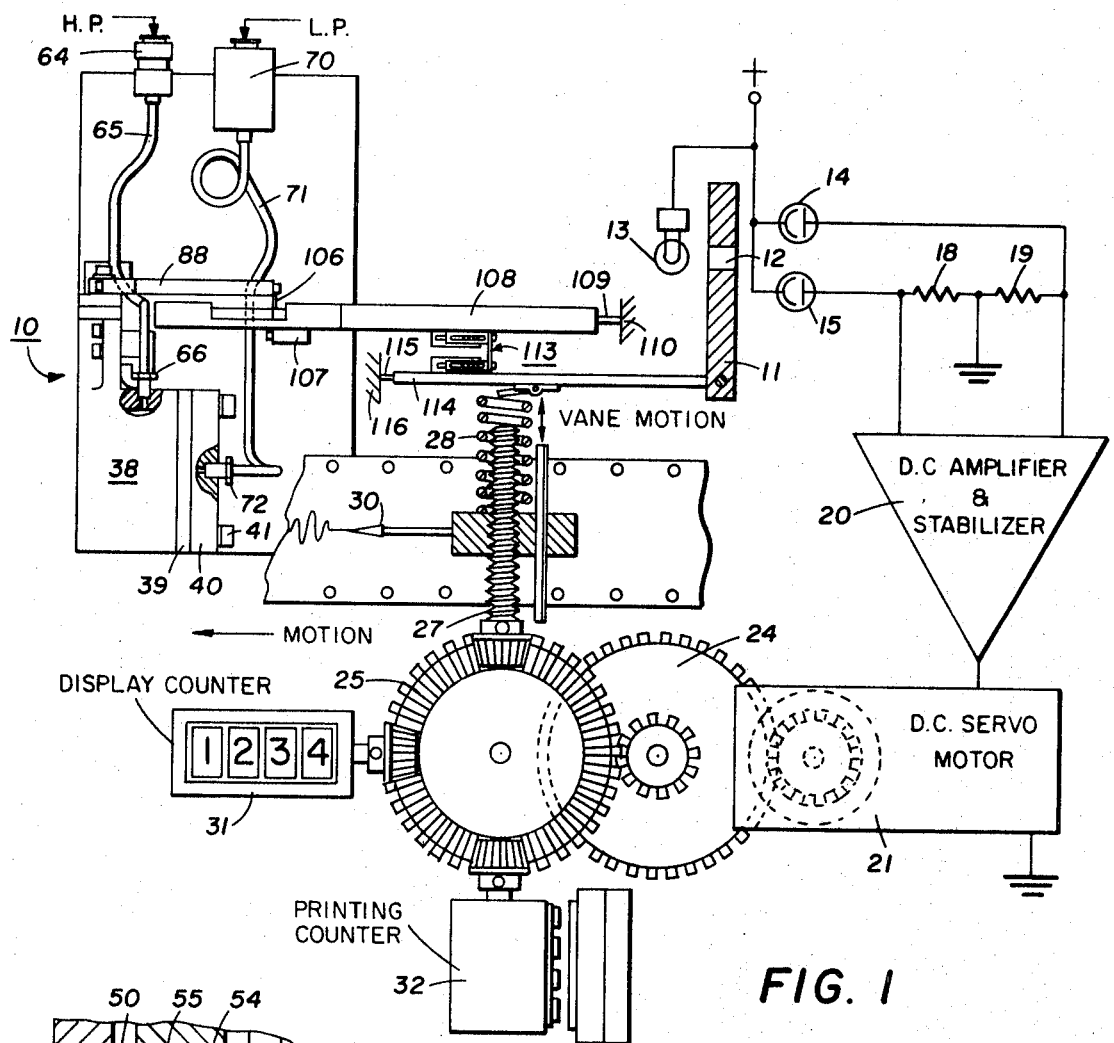
FIG. 1
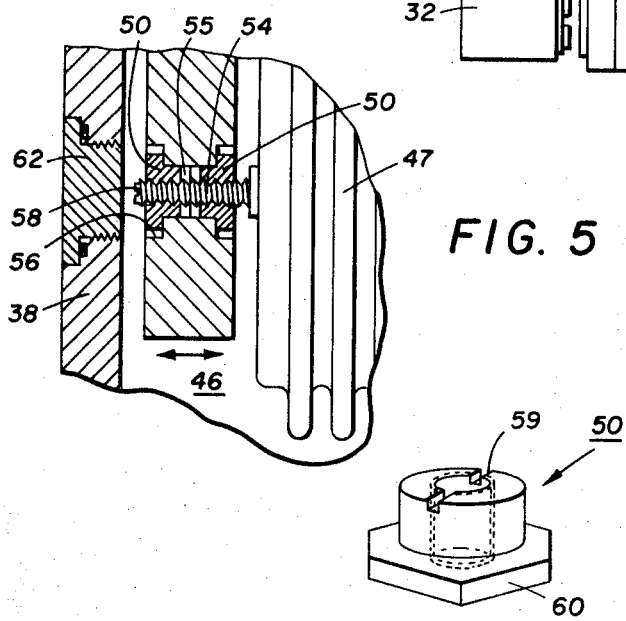
FIG. 5
FIG. 6
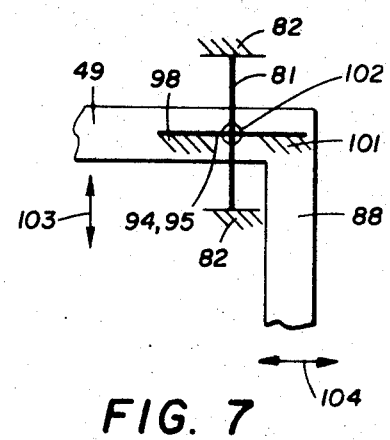
FIG. 7
INVENTORS:
JOSEPH E. GORGENS
WILLIAM A. HESKE
RANDALL GOFF
ATTORNEY

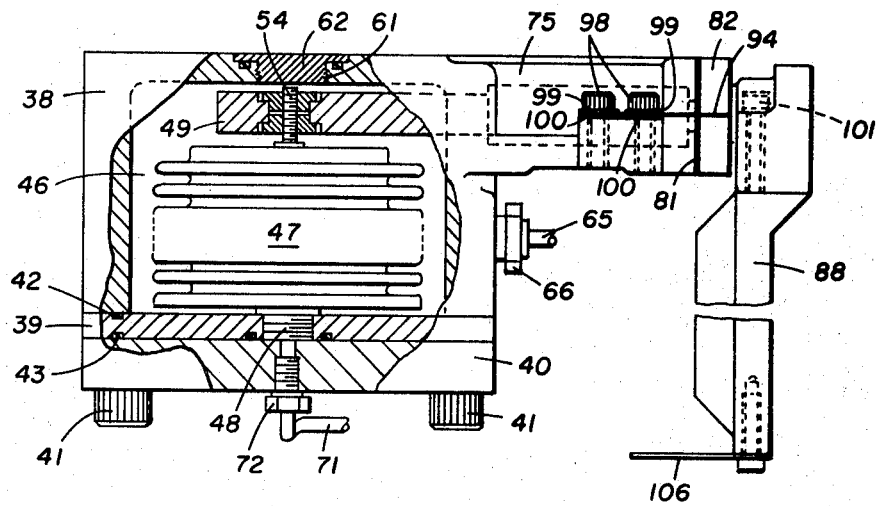

3,739,645

DIFFERENTIAL PRESSURE INDICATING APPARATUS

CROSS-REFERENCE TO RELATED APPLICATIONS

This application is a continuation-in-part of application Ser. No. 859,246, filed Sept. 17, 1969, which in turn is a continuation of application Ser. No. 732,472, filed Apr. 12, 1968 (now abandoned), and which in turn is a continuation-in-part of application Ser. No. 565,857, filed July 18, 1966 (now abandoned), all entitled "Condition Responsive Apparatus."

BACKGROUND OF THE INVENTION

1. The field of art to which this invention relates comprises, for example, devices which provide an indication or control operation in response to a particular variable condition such as fluid pressure, temperature, etc.

2. In most condition responsive instruments such as a pressure gauge or the like for providing visual or other indication of pressure values in the system to which it is connected, the instrument is characterized by direct pressure sensitivity of the sole system being measured. Where desired to obtain differential pressure readouts from one or more systems, it has been customary to employ a plurality of pressure sensing units, e.g. a pair of bellows, each connected to one of the pressures to be measured and acting in opposition to each other. Since it is usual for the bellows in these prior systems to receive inlet pressure on its interior while exposed to atmospheric pressure on its exterior, it is subject to a pressure differential across its walls which must be maintained well below material limits of which the bellows is constructed. As a consequence of these material limits, there is imposed a limit of static working pressure with which the prior opposing bellow systems can be used. Moreover, because bellows used in these prior systems are fabricated within a range of manufacturing tolerances affecting their effective areas, it is necessary to obtain a closely adjusted pressure matching to avoid unwanted introduction of error into the measuring system.

Recently there has been discovered a novel condition responsive apparatus as disclosed in the parent application hereof and capable of pressure measurement indication or signal emission to a high level of accuracy. The unit thereof employs the principle of force balance, null-position operation in which discrete changes in condition being measured produces bi-directional movement of a sensor from the null-position to in turn generate operating signals correlated and proportional to the degree of condition change. The signals so generated are effective via a drive mechanism to restore balance at null-position while concomitantly indicating gage values of the incurred condition. Being adapted for a high degree of sensitivity and readout accuracy, the unit includes a combination of mechanical drive with motive power from a variety of selective energy sources, such as pneumatic, electronic, electric, etc. Apparatus for adapting the unit of the parent application for either absolute or differential pressure sensitivity is disclosed in commonly assigned copending application Ser. No. 66,366 filed Aug. 24, 1970 and entitled "Pressure Indicating Apparatus".

SUMMARY

This invention relates to novel apparatus for effecting differential pressure sensitivity of a pressure measuring device. More particularly, the invention relates to an apparatus for effecting such sensitivity in a force balance null-position type pressure indicator as, for example, disclosed in the parent application hereof whereby to convert its sensitivity from direct pressure to differential pressure. In accordance herewith, a pressure sealed housing having a relatively high pressure inlet connection contains an expansion bellows having a relatively low pressure inlet connection. The bellows free end moves in proportion to the pressure differential between its received relatively low pressure input and the surrounding relatively high pressure input received internally of the housing. A lever connected to the bellows free end to outward of the housing transmits the bellows output force to the bidirectional sensor of the aforementioned null-position pressure indicator. By this means previous limits of static working pressure are eliminated subject only to continuing material limits afforded by the bellows. Likewise eliminated, is the previous problem of "matching" since each bellows is a unit by itself operatively responsive directly to the pressure difference inside and outside. Not only therefore does the device hereof afford the advantageous obtained by elimination of problems and limitations previously imposed, but at the same time its accuracy is enhanced by virtue of the increased sensitivity which the arrangement hereof provides. It should be appreciated that achieving the result in this manner is both expedient and less costly compared to such prior art techniques as to amount to a substantial advance in the art.

It is, therefore, an object of the invention to provide novel apparatus for effecting differential pressure sensitivity of a pressure measuring unit.

It is a further object of the invention to provide apparatus adapted to readily and simply convert a force balance null-position type pressure indicating apparatus from direct pressure to differential pressure sensitivity.

It is a further object of the invention to effect the aforesaid objects in a manner that eliminates need for pressure matching as known for effecting similar results in the prior art, and without limit on the operable static working pressure as previously imposed.

It is a still further object of the invention to provide apparatus for effecting the aforesaid objects which conveniently lends itself to unit operation for measuring differential pressures to which it is desired that the unit be sensitive.

BRIEF DESCRIPTION OF THE DRAWINGS

FIG. 1 is a schematic representation of the differential pressure apparatus of the invention in accordance herewith operative in conjunction with a null-position force balance pressure measuring device;

FIG. 2 is an enlarged longitudinal plan view partially in section of the differential pressure apparatus hereof;

FIG. 3 is a front elevation partially in section with the front housing cover removed.

FIG. 4 is an end elevation as viewed from the right end of FIG. 2;

FIG. 5 is a fragmentary sectional enlargement illustrating the bellows connection to its output lever;

FIG. 6 is an enlarged isometric of the adjusting nuts utilized in the connection of FIG. 5; and FIG. 7 is a fragmentary schematic illustration of external sensor movement produced by the bellows output lever.

Reference is now made to the drawings in which the invention hereof is disclosed in conjunction with a pressure indicating apparatus of the aforesaid null-position type as disclosed in the parent application and incorporated herein by reference. Whereas various embodiments are disclosed in the parent application enabling operation in conjunction with a variety of energy sources, such as electronic, pneumatic, electrical, etc., for sake of briefness only the electronic embodiment will be alluded to for an understanding of the invention hereof. It is understood, of course, that use of the invention is not intended to be so limited.

Referring now specifically to FIG. 1 differential pressure of the system being measured is sensed by the device hereof designated 10, as will be described below, and the output of which is connected to a vane member 11. The vane member has a transverse slit 12 which when in the null-position is located intermediately positioned between a constantly energized lamp 13 and dual photo-cell elements 14 and 15. In this relation, a constant but minimal illumination is exposed to each of the photo-cells and by virtue of a balanced bridge circuit formed by resistors 18 and 19 intermediately biased to ground, a zero voltage differential exists across the inputs to differential amplifier-stabilizing network generally designated 20. Output movement of differential pressure cell 10 in response to changes in the sensed pressure differentials causes the light beam passing through slit 12 to be shifted off center as to unbalance the bridge and result in an amplified signal to drive DC servo-motor 21. Both direction and operational rate of motor 21 is correlated and proportional to the position shift of slit 12 and is effective via a feedback mechanism comprising gears 24, 25, and 26, leadscrew 27 and feedback spring 28 to return vane slit 12 to null-position at which the light beam rebalances the bridge. In the course of rebalancing to null-position, the feedback mechanism is adapted to operate a variety of remote indicators such as transcribing pen 30, visual display 31 and/or printing counter 32, by which the measured condition can be appropriately indicated.

Referring now also to FIGS. 2–6, the differential pressure unit or cell 10 hereof is comprised of an L-shaped cast housing 38 defining a centrally open cavity 46. The housing is generally closed at its back and formed pressuretight via a closure plate 39 and a cover 40 secured by cap screws 41 against annular O-ring gaskets 42 and 43. Within cavity 46 is contained an extension bellows 47 secured by screwed nipple connection 48 at its forward end to closure plate 39 maintained essentially free or shielded of atmospheric pressure effects by means of cover 40. Connected at the opposite floating or moving end of the bellows is a laterally extending longitudinal lever 49 mounted by means of a pair of adjusting nuts 50 (FIGS. 5 and 6) each threaded onto bellows stud 54 having a screwdriver slot 58 and extending through lever opening 55. Counterbores 56 and 57 receive the adjusting nuts each of which also includes a screwdriver slot 59 and a hex end 60 for wrench engagement during assembly. A threaded access port 61 receives a removable O-ring seal plug 62 for servicing the latter connection while maintaining the housing pressure tight during normal operation of the device. This construction permits setting lever 49 starting position at a required distance inward from the housing wall whereby to compensate for variations in bellows dimension as will be understood.

Whereas the differential pressure to which the unit hereof is sensitive is the difference in existing pressures on the interior and exterior of bellows 47 the higher of the reference pressures to be sensed is preferably supplied onto the exterior thereof. For these purposes therefore the higher pressure is received at a fitting 64 and through tube 65 connecting to fitting 66 communicates the pressure thereof to housing cavity 46. At the same time, the lower of the reference pressures to be sensed is received at a fitting 70 from which a tube 71 communicates the pressure to a fitting 72 connecting directly through nipple 48 into the interior of bellows 47.

Bellows movement in correlation with the pressure differential received at fittings 64 and 70 is transmitted via lever 49 to outward of the housing for effecting a corresponding or correlated movement of vane member 11. For this purpose there is provided a controlled flexure connection to enable transmitting lever movement while maintaining the pressure tight relation required of the housing. This can be best understood with particular reference to FIGS. 2–4 and 7 and from where it can more readily be seen that housing 38 includes a laterally extending integrally cast leg or arm 75. Coextensive centrally within the arm is a longitudinal opening 76 through which lever 49 freely extends with sufficient clearance to afford freedom of required transverse movement. The rightward end of arm 75 (as viewed in the drawings) terminates in a vertical face 80 against which is flush positioned a thin metal flexible diaphragm plate 81 transversely superimposed to opening 76. A circular clamp 82 is screw connected at 83 to arm 75 for engaging diaphragm 81 at its outer extent and maintaining it in firm engagement against end face 80 while compressed O-ring gasket 84 maintains the required pressure tight relation to within the housing.

For effecting output of lever 49 outward of the housing there is provided an output beam 88 connected to diaphragm 81 and extending in a direction perpendicular to lever 49. Beam 88 includes an integral boss like enlargement 89 laterally extending coaxially through clamp aperture 90 to provide end face flush engagement against diaphragm 81. A counter-sunk screw 91 screwed inwardly of boss 89 through the diaphragm into the end of lever 49 maintains the latter relation permanently secured. Also connecting arm 75 to output beam 88 are a pair of top and bottom longitudinally extending flexure members 94 and 95 providing support in an axial direction to restrain lever 49 against internal pressure acting against diaphragm 81. Each of these latter flexures are mounted on arm 75 at dog ears 96 and 97 respectively by means of a pair of screws 98 each in turn securing the flexures between a pair of shim-washers 99 and 100. Screws 101 similarly connect flexures 94 and 95 to output beam 88.

To insure that the device is truly responsive to existing differential pressures across bellows 47, it is essential that the pressure seals and connecting flexible linkage not itself impose any net force by virtue of the pressures acting against them. COnsequently, the plane of flexures 94 and 95 are coincident and are adjusted at assembly to insure that they lie at the effective area center of diaphragm 81. Since the precise center is unknown in advance of assembly, the same static pressure is initially applied both internally and externally of the bellows, while shim-washers 99 and 100 are used to move the grounded ends of flexures 94 and 95 until a precise balanced condition is achieved. Once balance is obtained the transmission of bellows forces are accurately representative of the existing differential pressures and can be best understood by specific reference to the diagrammatic showing of FIG. 7. For illustrative purposes the securing of flexure ends and diaphragm are depicted symbolically as anchors and there is shown a center of rotation for the pivot intersection designated 102. In this construction, movement of lever 49 in response to bellows movement in the direction shown by arrow 103 effects a moment about pivot intersection 102 to produce correlated movement of output beam 88 in a perpendicular direction as indicated by arrow 104.

Referring again to FIG. 1, movement of output beam 88 is transmitted through a screw connected flexure plate 106 to a screw connection at an anchor 107 secured to the underside of cantilevered flexure beam 108. The latter beam is pivot mounted at 109 to a stationary support 110 and in turn is connected through a span adjustment 113 to a cantilevered flexure beam 114 similarly pivot mounted at 115 to stationary support 116. At its opposite end, beam 114 is joined to vane member 11 for producing movement thereof as described above and at an intermediate location is connected to feedback spring 28.

By the above description there has been disclosed a novel differential pressure unit which is compact and readily adapted for converting the pressure measuring apparatus of the copending parent application hereof to a differential pressure output. By utilizing the interior cavity of a cast housing for receiving the higher of the supplied reference pressures and the contained bellows interior for receiving the lower of the supplied reference pressures, the previous limitations imposed on static working pressures of such differential pressure cells has been eliminated. It is of course understood that during initial startup, both the high and low reference pressures are simultaneously and carefully applied as to avoid any substantial difference at the onset exceeding material limits of the bellows and which could deleteriously affect later performance of the bellows. By means of the unique flexible interconnection of the response lever 49 to the output beam 88, a perpendicular motion is transmitted through a flexible cross pivot connection having sufficient flexibility to permit diaphragm rotation about an intersecting axis. The diaphragm member used herein has itself sufficient flexibility to meet required spring rate limitations without need to per se afford the strength necessary to offset effects of static working pressure being applied against it. By this arrangement therefore, the flexure members cannot acquire an unstable compression state resulting from varying conditions such as a vacuum pressure in the housing thus rendering the cell suitable for measuring differential pressure both above and below atmospheric pressure. By appropriately selected components having compatible operating characteristics including effective bellows areas, spring rates, diaphragms, flexures, etc. a complete operating range of the measuring device can be readily achieved.

Since many changes could be made in the above construction and many apparently widely different embodiments of this invention could be made without departing from the scope thereof, it is intended that all matter contained in the drawings and specification shall be interpreted as illustrative and not in a limiting sense.

The embodiments of the invention in which an exclusive property or privilege is claimed are defined as follows:

1. A differential pressure sensing unit comprising:
   a. a pressure tight housing defining an internal cavity;
   b. an expansion bellows mounted within said housing cavity free to expand and contract therein in response to differential pressures to which it is exposed;
   c. a first inlet means for receiving an inlet pressure of a first value for supply within said cavity in external relation to said bellows;
   d. a second inlet means for receiving an inlet pressure of a second value for supply to internally of said bellows;
   e. a movable lever secured to said bellows and extending in a direction laterally therefrom, said lever being operably responsive to expansion and contraction movement of said bellows for transmitting a correlated movement thereof;
   f. an output arm external of said housing; and
   g. a pivot flexure connecting said lever to said output arm for transmitting bellows movement of the former to the latter, said pivot flexure defining a rotational center pivot intersection transmitting said lever arm movement in a first direction to output arm movement in a second direction offset from said first direction.

2. A differential pressure sensing unit according to claim 1 in which said first and second movement directions are at substantially right angles to each other.

3. A differential pressure sensing unit according to claim 1 in which said pivot flexure includes a plurality of flexure members arranged in cross planes defining said rotational center pivot intersection.

4. A differential pressure sensing unit according to claim 3 in which said flexure members include a flexible diaphragm secured at its outward extend and sandwiched transversely intermediate said lever and said output arm and a pair of individual flexures connecting said output arm to said housing and arranged extending in a coincident plane intersection said diaphragm with the effective center thereof.

5. A differential pressure sensing unit to claim 4 in which said individual flexures and said diaphragm extend in planes substantially perpendicular to each other.

6. In a pressure indicating apparatus including pressure responsive means bidirectionally movable, and means operably connecting to said pressure responsive means for correlated movement in conjunction therewith relative to a null-position, the improvement comprising a differential pressure sensing unit for movably operating said pressure responsive means in response to differential pressure changes from a plurality of sensed pressure sources, said differential pressure unit comprising:
   a. a pressure tight housing defining an internal cavity;
   b. an expansion bellows mounted within said housing cavity free to expand and contract therein in response to differential pressures to which it is exposed;

c. a first inlet means for receiving an inlet pressure of a first value for supply within said cavity in external relation to said bellows;

d. a second inlet means for receiving an inlet pressure of a second value for supply to internally of said bellows;

e. a movable lever secured to said bellows and extending in a direction laterally therefrom, said lever being operably responsive to expansion and contraction movement of said bellows for transmitting a correlated movement thereof;

f. an output arm external of said housing operably connecting to said pressure responsive means; and g. a pivot flexure connecting said lever to said output arm for transmitting bellows movement of the former to the latter, said pivot flexure defining a rotational center pivot intersection transmitting said lever arm movement in a first direction to output arm movement in a second direction offset from said first direction.

7. In a pressure indicating apparatus according to claim 6 in which said first and second movement directions are at substantially right angles to each other.

8. In a pressure indicating apparatus according to claim 6 in which said pivot flexure includes a plurality of flexure members arranged in cross planes defining said rotational center pivot intersection.

9. A differential pressure sensing unit according to claim 8 in which said flexure members include a flexible diaphragm secured at its outward extend and sandwiched transversely intermediate said lever and said output arm and a pair of individual flexures connecting said output arm to said housing and arranged extending in a coincident plane intersecting said diaphragm with the effective center thereof.

* * * * *